United States Patent
Choi et al.

(10) Patent No.: US 10,363,602 B2
(45) Date of Patent: Jul. 30, 2019

(54) METAL NANOPARTICLES, AND PREPARATION METHOD THEREFOR

(71) Applicant: Korea Research Institute of Chemical Technology, Daejeon (KR)

(72) Inventors: Young Min Choi, Daejeon (KR); Eun Jung Lee, Daejeon (KR); Sun Ho Jeong, Daejeon (KR); Yeong Hui Seo, Gwangmyeong-si (KR); Beyong Hwan Ryu, Daejeon (KR); Su Yeon Lee, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 15/314,759

(22) PCT Filed: May 29, 2015

(86) PCT No.: PCT/KR2015/005410
§ 371 (c)(1),
(2) Date: Nov. 29, 2016

(87) PCT Pub. No.: WO2015/183034
PCT Pub. Date: Dec. 3, 2015

(65) Prior Publication Data
US 2017/0197244 A1    Jul. 13, 2017

(30) Foreign Application Priority Data
May 30, 2014   (KR) ........................ 10-2014-0065947

(51) Int. Cl.
*B22F 1/00*   (2006.01)
*B22F 1/02*   (2006.01)
(Continued)

(52) U.S. Cl.
CPC .......... *B22F 1/0014* (2013.01); *B22F 1/0018* (2013.01); *B22F 1/0062* (2013.01);
(Continued)

(58) Field of Classification Search
None
See application file for complete search history.

(56) References Cited

U.S. PATENT DOCUMENTS

| 8,558,117 B2 * | 10/2013 | Hanson | C09D 11/52 174/256 |
| 2010/0009071 A1 * | 1/2010 | Chopra | B22F 1/0014 427/123 |
| 2012/0037041 A1 * | 2/2012 | Nolte | B22F 1/0062 106/287.18 |

FOREIGN PATENT DOCUMENTS

| CN | 1678418 A | 10/2005 |
| KR | 20070110084 A | 11/2007 |

(Continued)

OTHER PUBLICATIONS

International Search Report dated Sep. 2, 2015; PCT/KR2015/005410.
(Continued)

*Primary Examiner* — Alexandre F Ferre
(74) *Attorney, Agent, or Firm* — Ladas & Parry LLP

(57) ABSTRACT

Metal nanoparticles according to the present invention have at least a bimodal size distribution in which the ratio obtained by dividing the area of a first peak, which has the smallest median size on the basis of the median size of peaks in the size distribution of the metal nanoparticles, by the total area of all peaks constituting the size distribution meets 0.4-0.8, and are capped with a capping layer containing an organic acid.

12 Claims, 2 Drawing Sheets

(51) Int. Cl.
*B33Y 70/00* (2015.01)
*B22F 9/18* (2006.01)
*B22F 9/24* (2006.01)

(52) U.S. Cl.
CPC ............. *B22F 1/02* (2013.01); *B22F 9/18* (2013.01); *B22F 9/24* (2013.01); *B33Y 70/00* (2014.12); *B22F 2301/052* (2013.01); *B22F 2301/10* (2013.01); *B22F 2301/15* (2013.01); *B22F 2301/30* (2013.01); *B22F 2999/00* (2013.01); *Y02P 10/295* (2015.11)

(56) References Cited

FOREIGN PATENT DOCUMENTS

| | | | | |
|---|---|---|---|---|
| KR | 20100082609 A | 7/2010 | | |
| KR | 20130032190 A | 4/2013 | | |
| KR | 20130111180 A | 10/2013 | | |
| WO | 2013/147535 A1 | 10/2013 | | |
| WO | WO-2013147535 A1 * | 10/2013 | ............ | B22F 1/0018 |
| WO | WO-2014050156 A1 * | 4/2014 | ............... | C08K 3/08 |

OTHER PUBLICATIONS

Jeroen Jordens, et al; "Ultrasound precipitation of manganese carbonate: The effect of power and frequency on particle properties", Ultrasonics Sonochemistry 26, pp. 64-72; available online Jan. 24, 2015.

P.R. Rios, et al; "Abnormal Grain Growth Kinetics of BαTiO$_3$ With An Excess TiO$_2$", Acta Materialia. vol. 46, No. 5, pp. 1617-1623, Mar. 2, 1998.

* cited by examiner

【FIG. 1】
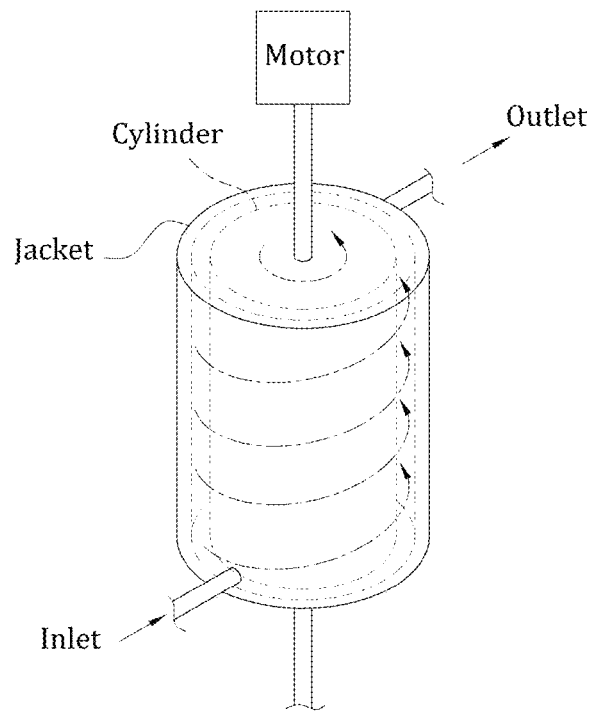
【FIG. 2】
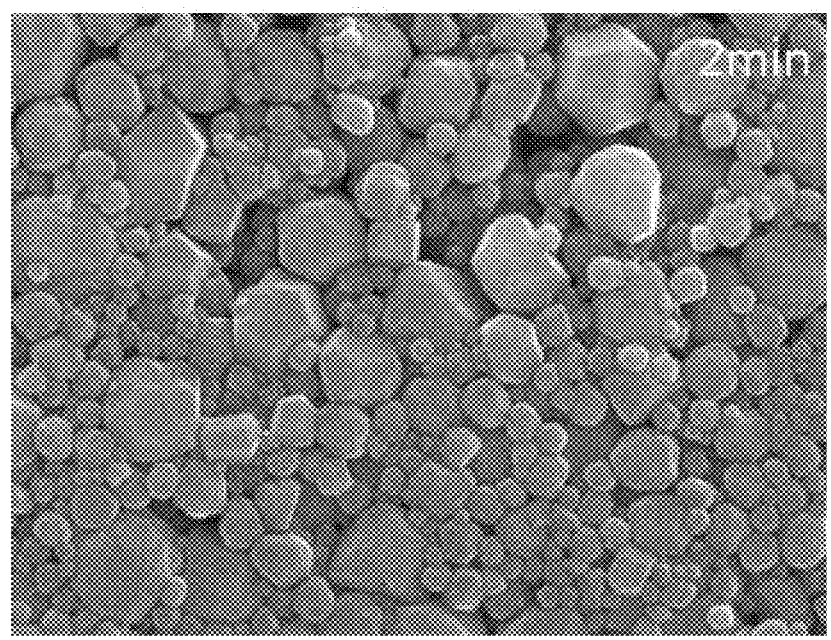

[FIG. 3]
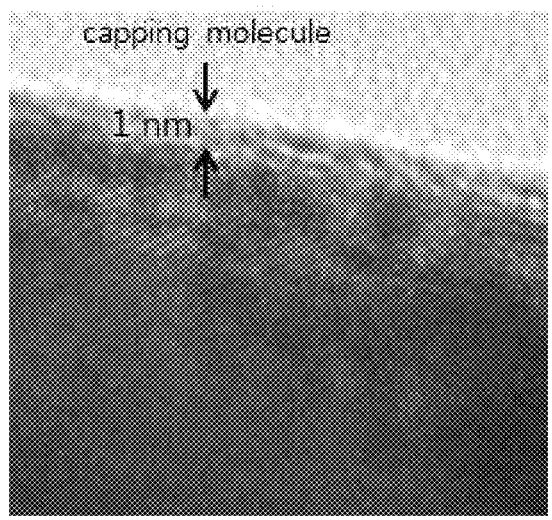

METAL NANOPARTICLES, AND PREPARATION METHOD THEREFOR

TECHNICAL FIELD

The present invention relates to metal nanoparticles and a preparation method thereof, and more particularly, to metal nanoparticles having extremely good sinterability so that metal wiring having excellent conductivity may be formed.

BACKGROUND ART

The study of manufacturing electronic component elements and energy application components by utilizing various printing processes based on ink and paste containing metal nanoparticles is one of the megatrends in the current technology development.

An ink containing metal nanoparticles has advantages of simplifying the process by printing finely patterned metal wiring on various substrates by a single printing process such as screen printing, inkjet printing, gravure offset printing and reverse offset printing, without using a complicated process of photolithography. Further, the process simplification therefrom allows manufacturing costs to be dramatically reduced, and miniaturization of a wiring width allows a printed circuit of high density and high efficiency to be manufactured.

The present applicant noted that in a metal nanoparticle-based ink, the conductivity property of metal wiring is deteriorated by an oxide film present on the surface of metal nanoparticles, and has provided a method of synthesizing metal nanoparticles on the surface of which formation of an oxide film is controlled (International Patent Publication No. WO 2013-147535).

The present applicant deepened the study of the method of synthesizing metal nanoparticles as suggested for a long period, and as a result, found out that when distribution, they may have significantly excellent sinterability, even in the case that the surface oxidation of the metal nanoparticles occurs to some degree, and in particular, they are suitable for light sintering or laser sintering, and completed the present invention.

DISCLOSURE

Technical Problem

An object of the present invention is to provide metal nanoparticles having excellent sinterability, even in the case that surface oxidation occurs.

Another object of the present invention is to provide metal nanoparticles capable of manufacturing metal wiring having excellent electrical conductivity, even in the case of being irradiated with very low light energy.

Another object of the present invention is to provide a preparation method of metal nanoparticles, capable of mass-producing metal nanoparticles on which formation of an oxide film is prevented, continuously within a short time Still another object of the present invention is to provide a preparation method of metal nanoparticles, capable of mass-producing metal nanoparticles having excellent sinterability, in particular, light sinterability or laser sinterability, continuously.

Technical Solution

In one general aspect, metal nanoparticles have at least, a bimodal or higher size distribution, and satisfy the following Equation 1, in which a metal core is capped by a capping layer containing an organic acid:

$$0.14 \leq A_1/A_t \leq 0.8 \quad \text{[Equation 1]}$$

wherein $A_1$ is an area of a first peak having a smallest median size, based on a median size of peaks, in a size distribution of the metal nanoparticles; and $A_t$ is the sum of areas of all peaks forming the size distribution.

The metal nanoparticles according to an exemplary embodiment of the present invention may further satisfy the following Equations 2 and 3:

$$30 \text{ nm} \leq D_1 \leq 100 \text{ nm} \quad \text{[Equation 2]}$$

wherein $D_1$ is a median size of the first peak;

$$3 \leq D_2/D_1 \leq 5 \quad \text{[Equation 3]}$$

wherein $D_1$ is a median size of the first peak having a smallest median size, based on a median size of peaks, in a size distribution of the metal nanoparticles; $D_2$ is a median size of the second peak having a largest median size, based on a median size of peaks, in the same size distribution.

In the metal nanoparticles according to an exemplary embodiment of the present invention, the particles belonging to the second peak having at least the largest median size, based on the median size of peaks, in the size distribution, may have a faceted shape.

In the metal nanoparticles according to an exemplary embodiment of the present invention, the primary particles belonging to the first peak may have an oxidation degree of 0.2 of less, wherein the oxidation degree is a ratio obtained by dividing a Cu 2p peak area, of copper oxides by a Cu 2p peak area of copper, in an X-ray photoelectron spectroscopy spectrum.

In the metal nanoparticles according to an exemplary embodiment of the present invention, the organic acid may be one or two or more selected from the group consisting of oleic acid, lysine oleic acid, stearic acid, hydroxystearic acid, linoleic acid, aminodecanoic acid, hydroxydecanoic acid, lauric acid, decenoic acid, undecenoic acid, palitoleic acid, hexyldecanoic acid, hydroxypalmitic acid, hydroxymyristic acid, hydroxydecanoic acid, palmitoleic acid and myristoleic acid.

In the metal nanoparticles according to an exemplary embodiment of the present invention, the capping layer has a thickness of 1 to 2 nm.

The metal nanoparticles according to an exemplary embodiment of the present invention may be one or two or more selected from the group consisting of copper, nickel, tin, aluminum and an alloy thereof.

The metal nanoparticles according to an exemplary embodiment of the present invention may be for light sintering.

A continuous preparation method of metal nanoparticles in which a metal core is capped by a capping layer containing an organic acid according to the present invention includes a step of continuously injecting a first solution containing an organic acid, an organic amine and a metal precursor and a second solution containing a reducing agent to a reaction space between a hollow cylindrical jacket and a rotating cylinder forming a concentric structure with the jacket and being disposed apart from the jacket.

In the continuous preparation method according to an exemplary embodiment of the present invention, the first and second solutions may be continuously injected to the reaction space, through an inlet, formed in one end or one end side of the jacket, and a reaction product including metal nanoparticles capped by a capping layer containing an organic acid may be continuously discharged, through an outlet formed in the other end or the other end side of the jacket.

In the continuous preparation method according to an exemplary embodiment of the present invention, the jacket and the cylinder may satisfy the following Equation 4:

$$0.1 \leq D/r_i \leq 0.4 \quad [\text{Equation 4}]$$

wherein D is a spaced distance between the jacket and the cylinder; and $r_j$ is a radius of the cylinder.

In the continuous preparation method according to an exemplary embodiment of the present invention, the rotational speed of the cylinder may foe 400 to 1000 rpm.

In the continuous preparation method according to an exemplary embodiment, of the present invention, the temperature of the reaction space may be 100 to 350° C.

Advantageous Effects

As the metal nanoparticles according to the present invention are light-sintered by being irradiated with extremely low light energy, they have advantages of being capable of manufacturing a conductive metal thin film having very excellent electrical conductivity, comparable to bulk, and also having extremely good binding force to a substrate.

The preparation method according to the present invention has advantages in that metal nanoparticles on which formation of an oxide film is prevented, may be efficiently mass-produced, it has a high yield, and the size distribution of metal nanoparticles may be controlled precisely and reproducibly.

DESCRIPTION OF DRAWINGS

FIG. 1 is a drawing illustrating a reaction device used in the preparation method, according to an exemplary embodiment of the present invention.

FIG. 2 is a scanning electron micrograph observing the metal nanoparticles prepared in an exemplary embodiment of the present invention.

FIG. 3 is a transmission electron micrograph observing a capping layer thickness of the metal nanoparticles prepared in an exemplary embodiment of the Present invention.

BEST MODE

Hereinafter, the metal nanoparticles of the present invention and the preparation method of the same will be described in detail with reference to the accompanying drawings. The drawings to be provided below are provided by way of example so that the idea of the present invention can be sufficiently transferred to those skilled in the art to which the present invention pertains. Therefore, the present invention is not limited to the drawings provided below but may be modified in many different forms. In addition, the drawings suggested below will be exaggerated in order to clear the spirit and scope of the present invention. Technical terms and scientific terms used herein have the general meaning understood by those skilled in the art to which the present invention pertains unless otherwise defined, and a description for the known function and configuration obscuring the present invention will be omitted in the following description and the accompanying drawings.

In the case of conventional metal nanoparticles, as their particle size is small, a ratio of the atom number present on the surface of the metal nanoparticle is drastically increased, as compared with the atom number forming the metal nanoparticle, so that a ratio of an oxidation film on the surface in the particle is significantly increased. Accordingly, in order to manufacture a conductive thin film, metal nanoparticles substantially having a size of 300 nm or more have been used.

However, in order to manufacture metal wiring having excellent electrical conductivity by low temperature heat treatment, a technique for inhibiting formation of an oxide film on the surface and manufacturing metal nanoparticles as fine as available is urgently required.

According to the technical requirements, the present applicant has provided a preparation method of fine metal nanoparticles, capped by an organic acid, thereby preventing formation of an oxide film on the surface, in the International Patent Publication No. WO 2013-147535. Specifically, the present applicant have provided a preparation method of metal nanoparticles, wherein a reaction solution containing a metal precursor, an organic acid, an organic amine and a reducing agent is heated and stirred, thereby preventing an oxidation film on the surface, and capping the particles by an organic acid.

Considering that the technique provided by the International Patent Publication No, WO 2013-147535 is a batch preparation method, the present applicant found out in the course of further study of a continuous preparation method capable of mass production and commercialization, that in the case that metal nanoparticles have a certain distribution, sinterability of the metal nanoparticles is significantly improved, and furthermore, found out that though the surface oxidation of the metal nanoparticles occurs to some degree, the metal nanoparticles may have excellent light or laser sinterability, and particularly, significantly excellent light sinterability, and thus, completed the present invention.

Hereinafter, in the description of the present invention, unless otherwise stated, the metal nanoparticle means a metal nanoparticle capped by a capping layer containing an organic acid, and the terms, the metal nanoparticle and the metal nanoparticles capped by a capping layer may be used interchangeably. Here, a particulate metal surrounded by a capping layer containing an organic acid is referred to as a metal core.

Further, unless otherwise limited, the metal nanoparticles refer to a particle group in which relatively fine particles and relatively coarse particles are mixed. Specifically, the metal nanoparticles refer to a group of plural nanoparticles capable of representing a statistically stable size distribution. As a specific example, the metal nanoparticles may refer to a group of particles composed of at least 500 or more metal nanoparticles.

The metal nanoparticles according to the present invention are the particles in which a metal core is capped by a capping layer containing an organic acid, have at least a bimodal or higher size distribution, and satisfy the following Equation 1:

$$0.4 \leq A_1/A_t \leq 0.8 \quad [\text{Equation 1}]$$

wherein $A_1$ is an area, of the first peak having a smallest median size, based on a median size of peaks, in a size distribution of the metal nanoparticles (a size distribution with two axes of number and size); and $A_t$ is the sum of areas of all peaks forming the size distribution. That, is, Equation 1 is a ratio obtained by dividing the number of the particles forming the first peak by the total number of particles.

In one specific exemplary embodiment of the present invention, the size distribution of the metal nanoparticles may be measured by using dynamic light scattering (DLS), and specifically, may be measured under the condition of a sample (size analysis subject nanoparticles) in a concentration of 0.01 to 0.1 wt % at a temperature of 25° C. The size distribution of the metal nanoparticles may be shown as a diameter of the particles and the number of particles having the diameter. At least a bimodal or higher size distribution may represent that at least two or more peaks are present in the size distribution of the metal nanoparticles. Here, the size corresponding to the center of a peak (particle diameter) is a median size, and the particles belonging to the first peak having the smallest, median size are commonly referred to as primary particles, and the particles belonging to the second peak having the largest median size are commonly referred to as secondary particles.

As presented, by Equation 1, the metal nanoparticles according to the present invention are characterized in that of the relatively small primary particles, and the relatively large secondary particles, the relatively small primary particles have a significantly higher fraction.

As well known in the art, in the production and growth of all particles, growth pattern is divided into normal grain growth and abnormal grain growth. It is known in the art that among these, pure metals having excellent conductivity such as copper, nickel and aluminum do not undergo general normal grain growth, but undergo abnormal grain growth wherein only some specific particles grow abnormally large at a very rapid growth rate. It is interpreted that this abnormal grain growth occurs, when the particles require much higher energy for particle growth, as compared with the particles undergoing normal grain growth, and thus, only some particles having high driving force of growth selectively grow.

Like grain growth, densification is also a change from a solid phase—gas phase interface to a solid phase—solid phase interface by mass transfer. Accordingly, it is known that in the case that abnormal grain growth having a high energy barrier of mass transfer occurs, densification is also difficult.

In the case of metal nanoparticles capped by a capping layer, formation of an oxide film on the surface is inhibited, thereby representing a growth characteristic of pure metal when sintering. Based on this growth characteristic of pure metal, according to Equation 1, when particles have a distribution where a large amount of primary particles are present, together with secondary particles capable of having high growth driving force (driving force of mass transfer) so that the secondary particles may be surrounded by the primary particles, thereby providing growth driving force uniformly to each of the secondary particles, they may have significantly improved sinterability.

Specifically, in Equation 1, when the fraction of the relatively fine primary particles corresponding to the first peak ($A_1/A_t$, an area ratio in the particle size distribution) based on the entire particles is less than 0.4 which is a trace amount, there is a risk that the secondary particles are not surrounded by the primary particles. In this case, the growth and densification (sintering) of the secondary particles may be influenced by adjacent other secondary particles, thereby deteriorating sinterability, and also a non-uniform film having a different sintering degree depending on the position of the film may be manufactured. That is, a state where the secondary particles are not uniformly dispersed in the matrix of the primary particles is not formed, and the growth or densification of the secondary particles is influenced by other secondary particles, so that the growth or densification of the secondary particles may hardly occur.

Further, in Equation 1, when the fraction of the relatively fine primary particles corresponding to the first peak ($A_1/A_t$, an area ratio in the particle size distribution) based on the entire particles is more than 0.8 which is an excessive amount, growth or densification hardly occurs only by the primary particles, and thus, an unsintered region where the sintering is hardly done may occur a lot.

That is, the above-described Equation 1 represents the condition where relatively coarse particles are uniformly surrounded by relatively fine particles so that growth and densification actively occur in a region where relatively coarse particles are present, and only relatively fine particles are present in a peripheral region involved in coarse particle growth (for example, region within a diffusion distance), thereby preventing the occurrence of the unsintered region where partly the sintering is hardly done.

In one specific exemplary embodiment of the present invention, the metal nanoparticles may have a bimodal or trimodal size distribution. Here, as described above, the metal nanoparticles may have improved sinterability by coarse particles having high growth driving force (mass transfer driving force) and fine particles uniformly providing growth driving force to the coarse particles, and thus, it is preferred that the metal nanoparticles have a bimodal size distribution so that they may have reproducible and homogeneous sinterability.

In one specific exemplary embodiment of the present invention, the metal nanoparticles may further satisfy the following Equations 2 and 3:

$$30 \text{ nm} \leq D_1 \leq 100 \text{ nm} \quad \text{[Equation 2]}$$

wherein $D_1$ is a median size of the first peak, that is, an average size of the primary particles;

$$3 \leq D_2/D_1 \leq 5 \quad \text{[Equation 3]}$$

wherein $D_1$ is a median size of the first peak having a smallest median size, based on a median size of peaks, in a size distribution of the metal nanoparticles; $D_2$ is a median size of the second peak having a largest median size, based on a median size of peaks, in the same size distribution. That is, in Equation 3, $D_1$ is an average size of primary particles; and $D_2$ is an average size of secondary particles.

As the metal nanoparticles satisfy the condition of Equation 1, and at the same time satisfy the conditions of Equations 2 and 3, extremely active mass transfer from the primary particles to the secondary particles occurs, so that the metal nanoparticles may have excellent sinterability.

In particular, Equations 1, 2 and 3 represent the condition that metal wiring having a significantly low specific resistance may be formed, with very low light energy, when light sintering which is an extremely rapid sintering method to cause sintering by irradiating light energy instantaneously.

The present applicant deepened the study of a preparation method of metal nanoparticles capped by an organic acid as suggested in WO 2013-147535, and as a result, in the case of relatively coarse particles, formation of an oxide film on the surface may be substantially completely prevented by capping a metal core by an organic acid. However, as the particle size is fine, partial surface oxidation of a metal core is capped by an organic acid or an organic acid and an organic amine. The chemical bonding between a metal and oxygen is observed even in the metal nanoparticles substantially having a size of 50 nm or so.

Surprisingly, when the primary particles are present in a large amount so as to satisfy Equation 1, even in the case that the size of the particles is so fine that surface oxidation occurs to some degree, like Equation 2, the metal nanoparticles may still maintain excellent sinterability.

This may represent that when mass transfer from relatively fine primary particles to relatively coarse secondary particles occurs, an adverse effect hardly appears by the oxide film formed by the fine primary particles. Furthermore, it may represent that the sintering properties of the entire metal nanoparticles are determined by the surface properties of the coarse secondary particles (coarse particles having a pure metal surface by preventing formation of an oxide film).

In the metal nanoparticles according to an exemplary embodiment of the present invention, the primary particles belonging to the first peak may have an oxidation degree of 0.2 or less, specifically 0.01 to 0.2. The oxidation degree may refer to a ratio obtained by dividing a Cu 2p peak area of copper oxides by a Cu 2p peak area of copper, in an X-ray photoelectron spectrum of the metal nanoparticles. Specifically, the X-ray photoelectron spectrum is measured under the condition of binding energy of 920-960 eV using an Al K$\alpha$ source in a vacuum degree of $10^{-8}$ or less, and the Cu 2p peaks of copper and copper oxides are extracted therefrom, thereby calculating the oxidation degree through an area ratio between the two peaks.

The average size of the primary particles in Equations 1 and 2, and the relative size of the secondary particles to the primary particles in Equation 3 are within a size range that the metal nanoparticles may have excellent sinterability, even in the case that fine metal nanoparticles having an oxidation degree up to 0.2 are present. Specifically, Equation 3 representing the average size of the secondary particles is a size range that when the secondary particles are present together with the primary particles, the metal particles may have uniform and homogeneous sintering properties, and also metal wiring having a significantly low specific resistance may be formed, with very low light energy.

In the metal nanoparticles according to an exemplary embodiment of the present invention, the particles belonging to the second peak (secondary particles) having at least the largest median size, based on the median size of peaks, in the size distribution, may have a faceted shape.

More specifically, the secondary particles may be a single crystal having a faceted shape. Flat surfaces of the faceted shape may be those corresponding to surface energy cusp on a $\gamma$-plot of a metal material forming a metal core. As well known in the art, the $\gamma$-plot has surface energy of the surface as a scalar value, using a vertical direction of a crystallographic plane as the unit vector.

Here, the faceted shape means that the surface of the particle is formed by including the faces corresponding to the surface energy cusp on $\gamma$-plot of a metal core material, and more preferably, formed only by the faces corresponding to the surface energy cusp. 'The faceted shape being formed only by the faces corresponding to the surface energy cusp' means that a tangent slope of the metal particle surface discontinuously changes. Specifically, the case that the tangent slope of the metal particle surface discontinuously changes refers to a shape in which the flat surfaces corresponding to the surface energy cusp are directly in contact, so that a sharp edge is formed.

As a specific example, the face corresponding to the surface energy cusp may be selected from the group consisting of a {111} plane family, a {110} plane family and a {100} plane family, based on the crystal structure of the metal core material. Here, of course, each face forming the surface includes the {111} plane family, the {110} plane family and/or the {100} plane family having a ledge or kink formed thereon.

Morphologically, at least the surface morphology of the secondary particles in the metal nanoparticles may be a faceted polygonal shape. As a more specific example, in the case that the metal core material has a FCC crystal structure like copper, nickel and aluminum, the surface shape of the secondary particles may be a faceted polygonal shape in which the {111} plane family forms the surface or a faceted polygonal shape in which the {111} plane family and the {110} plane family form the surface.

The relatively fine primary particles may have a round shape, or include a flat surface but at least, the edge where flat surfaces are in contact may have a round facet-like shape. That is, the facet-like shape refers to a shape in which a flat surface is present, but a curved surface area in which a tangent slope of the particle surface continuously changes is present.

The metal nanoparticles according to an exemplary embodiment of the present invention may be those in which a metal core is capped by a capping layer containing an organic acid. As the organic acid may form a dense organic acid film by preferential chemisorption on the metal core, the capping layer may be composed of the organic acid. That is, the capping layer may be a film of the organic acid chemisorbed on the metal core. However, of course, a trace amount of amine may be contained in the capping layer, due to the preparation process using an organic acid and an organic amine together. As the metal core is capped by the capping layer containing an organic acid, formation of an oxide film on the surface of the metal core may be prevented, and the secondary particles which are substantially relatively coarse particles may not have the oxide film on the surface.

The organic acid may be at least one type of straight-chain, branched and cyclic having 6-30 carbons, and may be one or two or more selected from, the group consisting of saturated or unsaturated organic acids. More specifically, the organic acid may be one or two or more selected from the group consisting of oleic acid, lysine oleic acid, stearic acid, hydroxystearic acid, linoleic acid, aminodecanoic acid, hydroxydecanoic acid, lauric acid, decenoic acid, undecenoic acid, palitoleic acid, hexyldecanoic acid, hydroxypalmitic acid, hydroxymyristic acid, hydroxydecanoic acid, palmitoleic acid, myristoleic acid, and the like, but not limited thereto.

The capping layer to cap the metal, core may have a thickness of 1 to 2 nm. If the capping layer is too thin, the effect of preventing formation of an oxide film may be decreased, and also, if the capping layer is too thick, excessive energy and time may be consumed for removing the organic capping layer, when manufacturing a metal thin film using the metal nanoparticles.

As the metal (metal core) of the metal nanoparticles in the form of a capsule which is capped by the capping layer containing the organic acid, and on which formation of the oxide film is prevented, any metal commonly used in the manufacture of a metal thin film is fine. A specific example may include one or two or more selected from the group consisting of copper, nickel, aluminum, tin and an alloy thereof.

The metal nanoparticles according to an exemplary embodiment of the present invention may be for light sintering or laser sintering. Specifically, in the case of forming a metal thin film by light sintering the metal nanoparticles according to an exemplary embodiment of the present invention, light with significantly low energy is irradiated within a very short time, thereby manufacturing a metal thin film having excellent physical and electrical performance. Further, in the case of laser sintering the metal nanoparticles according to an exemplary embodiment of the present invention, a fine metal pattern having excellent conductivity may be manufactured within a short time.

As described above, the metal nanoparticles according to an exemplary embodiment of the present invention may have excellent sinterability even by light irradiation with extremely low energy. As a specific example, a metal thin film having a specific resistance of several μΩ·cm may be manufactured, by being irradiated with light having an intensity of 2.6 (J/cm$^2$) or less.

More specifically, the metal nanoparticles according to an exemplary embodiment of the present invention may be metal nanoparticles for light sintering in which light in a visible wavelength range of 200 to 800 nm, preferably 370 to 800 nm, having an intensity of 2.6 (J/cm$^2$) or less is continuously irradiated. That is, after coating the metal nanoparticles according to an exemplary embodiment of the present invention, the coated film is continuously irradiated with light having a very low intensity in a visible wavelength range for 1 to 2 msec, thereby manufacturing a metal thin film having excellent conductivity (metal thin film), while preventing thermal damage of a substrate.

As described above, in the case of using the metal nanoparticles according to an exemplary embodiment of the present invention, a metal thin film having a specific resistance comparable to that of the metal thin film obtainable by sintering with heat treatment may be manufactured only by being irradiated with light having an extremely low intensity in a visible wavelength range for a very short time (1-2 msec). Here, as the sintering is carried, out with light of extremely low energy, an organic binder which is usually added for securing the binding strength between a substrate and a coated film when manufacturing a coated film (a film coated with an ink containing metal nanoparticles) may remain in the metal thin film even after light sintering, thereby significantly improving the binding strength between the metal thin film and a substrate.

The present invention includes a conductive ink composition containing metal nanoparticles in which a metal core is capped by a capping layer containing an organic acid.

Specifically, the ink composition according to an exemplary embodiment of the present invention may contain the above-described metal nanoparticles, a non-aqueous organic binder, and a non-aqueous solvent.

The non-aqueous solvent is not particularly limited, but preferably, may be one or two or more selected from the group consisting of alkane having 6-30 carbons, amine, toluene, xylene, chloroform, dichloromethane, tetradecane, octadecene, chlorobenzene, dichlorobenzene, chlorobenzoic acid and dipropylene glycol propyl ether.

The non-aqueous organic binder is not particularly limited, but any non-aqueous organic binder material may be used as long as it is commonly used for improving the physical binding strength of a coated film, when preparing a conductive ink containing metal nanoparticles. As a specific and non-limiting example, the non-aqueous organic binder material may be one or two or more selected from the group consisting of polyfluorovinylidene (PVDF), polymethylmethacrylate (PMMA), self-crosslinkable acrylic resin emulsion, hydroxyethylcellulose, ethylhydroxyethylcellulose, carboxymethylcellulose, hydroxycellulose, methylcellulose, nitrocellulose, ethylcellulose, styrenebutadiene rubber (SBR), a copolymer of C1-C10 alkyl(meth)acrylate and unsaturated carboxylic acid, gelatine, thixotone, starch, polystyrene, polyurethane, a resin containing a carboxylic group, a phenolic resin, a mixture of ethyl cellulose and phenolic resin, a ester polymer, a methacrylate polymer, a self-crosslinkable (meth)acrylic acid copolymer, a copolymer having an ethylenic unsaturated group, ethylcellulose-based, acrylate-based, epoxy resin-based materials, and a mixture thereof.

As a more specific example, the non-aqueous organic binder may be a non-aqueous polymer material having an amine value of 5-150 mgKOH/g. This non-aqueous polymer material is preferred, since it may serve as both a binder and a dispersant. Particularly, the non-aqueous organic binder may be a copolymer of unsaturated carboxylic acid, or a graft polymer thereof, and a copolymer of unsaturated carboxylic acid or a graft polymer thereof having an amine value of 5-150 mgKOH/g. This non-aqueous organic binder serves as both a binder and a dispersant, and also does not inhibit the binding between the metal nanoparticles when light sintering, thereby manufacturing a metal thin film which is denser and has more excellent conductivity. The copolymer of unsaturated carboxylic acid or the graft polymer thereof having an amine value of 5-150 mgKOH/g may include a copolymer of C1-C10 alkyl (meth)acrylate and unsaturated carboxylic acid, a copolymer of polyetherketone and unsaturated carboxylic acid, a copolymer of polyacrylamide and unsaturated carboxylic acid, a copolymer of polyethyleneoxide and unsaturated carboxylic acid, a copolymer of polyethyleneglycol and unsaturated carboxylic acid, or a mixture thereof. In the case of the copolymer of unsaturated carboxylic acid or a graft polymer thereof having an amine value of 5-150 mgKOH/g, it may have a molecular weight (weight average molecular weight) of 1000 to 50000 g/mol.

As the non-aqueous organic binder, commercial products containing the above-described non-aqueous organic binder materials may be used, and as a specific example, BYK130, BYK140, BYK160, BYK161, BYK162, BYK163, BYK164, BYK165, BYK167, BYK169, BYK170, BYK171, BYK174 EFKA 4610, EFKA 4644, EFKA 4654, EFKA 4665, EFKA 4620, EFKA 4666, or EFKA 4642 may be listed, but not limited thereto.

The conductive ink composition according to an exemplary embodiment of the present invention may contain 0.05 to 5 parts by weight of the non-aqueous organic binder, and 20 to 800 parts by weight of the non-aqueous solvent, based on 100 parts by weight of the metal nanoparticles.

As described above, in the case of coating the conductive ink composition containing the metal nanoparticles according to an exemplary embodiment of the present invention, and then irradiating light to carry out light sintering, the non-aqueous organic binder may remain in the conductive physical properties being not damaged. Accordingly, in the case that the content of the non-aqueous organic binder is too high in the conductive ink composition, densification between the metal nanoparticles may be deteriorated by a polymer binder for binding the metal nanoparticles to a substrate. 0.05 to 5 parts by weight of the non-aqueous organic binder relative to the particles is in the range of not inhibiting the densification between the metal nanoparticles, and also having the physical strength for stably maintaining a shape when the coated ink composition is dried, forming a coated film having excellent binding strength to a substrate, and at the same time, significantly improving the binding strength between the substrate and a metal thin film by a polymer binder remaining in the metal thin film after light sintering.

As described above, the ink composition according to an exemplary embodiment of the present invention may allow a metal thin film having specific resistance of several μΩ·cm to be manufactured, by irradiating light having an intensity of 2.6 (J/cm$^2$) or less. Here, in the case of containing the metal nanoparticles according to an exemplary embodiment of the present invention, light sintering of the metal nanoparticles occurs at a light intensity of 1.2 J/cm$^2$ or more, thereby manufacturing the metal thin film having low specific resistance, however, in the case that the thickness of the metal thin film to be manufactured is several microns to tens of microns, it is preferred that light having an intensity of 2.3 J/cm$^2$ or more is irradiated, in terms of producing the metal thin film having a uniform electrical property reproducibly.

More specifically, the ink composition according to an exemplary embodiment of the present invention may be an ink composition for light sintering in which light in a visible wavelength range of 200 to 800 nm, preferably 370 to 800 nm, having an intensity of 2.6 (J/cm$^2$) or less is continuously irradiated for a very short time of 1 to 2 msec.

The ink composition according to an exemplary embodiment of the present invention contains the above-described metal nanoparticles, and thus, 60 wt % or more of the polymer binder may remain in the metal thin film even after light irradiation, based on the amount of the polymer binder contained in the dried coated film of the ink composition before light irradiation, thereby capable of manufacturing a metal thin film having surprisingly improved binding strength to a substrate. As a specific example, in the adhesion strength test using a tape according to ASTM D3359-97, the state of a substrate and the metal thin film being strongly bonded is maintained, so that the metal thin film may not be peeled, off by the tape.

Though it may vary to some degree depending on the coating method of the conductive ink composition, the conductive ink composition may have appropriate flowability for coating or printing, by containing 20 to 800 parts by weight of the non-aqueous solvent.

The present invention includes a continuous preparation method of metal nanoparticles in which a metal core is capped by a capping layer containing an organic acid.

As described above, the present applicant has provided a preparation method of metal nanoparticles capped by an organic acid, in the International Patent Publication No. WO 2013-147535. However, as the provided technique is a batch preparation method, there is a limitation in mass production, and furthermore, it is difficult to adjust the quality of the prepared metal nanoparticles depending on the change of a fine process condition for each batch, and thus, the study for developing a continuous preparation method capable of mass production and commercialization has been conducted for a long period.

As a result of the study, it was found out that in the case of using a laminar shear flow continuous reaction technique, continuous preparation of metal nanoparticles capped by an organic acid in an extremely high yield is possible, and metal nanoparticles of uniform quality may be mass-produced within a short time.

Furthermore, it was found out that the relative fraction and the sizes of relatively coarse particles and relatively fine particles are easily adjustable, which is very difficult in a batchwise manner.

The continuous preparation method of metal nanoparticles according to the present invention includes a step of continuously injecting a first solution containing an organic acid, an organic amine and a metal precursor and a second solution containing a reducing agent to a reaction space between a hollow cylindrical jacket and a rotating cylinder forming a concentric structure with the jacket and being disposed apart from the jacket.

FIG. 1 is a drawing illustrating an example of a laminar shear flow reaction device usable in the preparation method according to an exemplary embodiment of the present invention. As shown in FIG. 1, the laminar shear flow reaction device may include a cylinder, a stirring rod formed in the inside center of the cylinder, and one end of which is connected to a motor to rotate the cylinder, a cylindrical jacket which is concentric with the stirring rod, and formed and fixed on the outer circumference of the cylinder, an inlet for adding materials to a reaction space which is a separate space between the jacket and the cylinder, and an outlet for discharging a reaction-completed product. Accordingly, the cylinder may have a rotational axis coinciding with a longitudinal axis of the jacket.

Here, as shown in FIG. 1, the inlet may be disposed on one end or one end side of the jacket, and the outlet may be disposed on the other end or the other end side. Further, of course, the laminar shear flow reaction device is disposed on the outer side of the jacket to further include a heating unit for heating the reaction space, and also the heating unit may be disposed in the form of surrounding the outer side of the jacket.

When the cylinder is rotated in the fixed jacket, a fluid flowing in the reaction space has a tendency to go out in a fixed jacket direction by centrifugal force, which causes the fluid to be unstable, thereby forming a Taylor-Couette vortex which is a vortex in a ring pair array rotating regularly in opposite directions to each other, along the rotational axis.

The Taylor-Couette vortex occurs only by relative rotation between the inner cylinder and the jacket, and thus, the flowability of the vortex may be defined well, and the fluctuations of the vortex may be hardly changed. Further, each vortex in a rotating ring pair array may form an independent reaction field to each other in the reaction space.

The present applicant found out that in the case that an organic acid, an organic amine, a metal precursor and a reducing agent are added to this vortex in a ring pair array and a fine reaction field defined by the vortex, to prepare metal nanoparticles, metal nanoparticles in which a metal core is capped by a capping layer containing an organic acid are prepared stably and reproducibly, in an extremely high yield.

Specifically, in the laminar shear flow continuous reaction technique based, on the Taylor-Couette vortex, a vortex having well-defined flow occurs only by a cylinder rotation, and as each vortex forms an independent fine reaction field, metal nuclei are produced from a metal in a precursor state, and in the course of growing the metal nuclei to metal nanoparticles, the metal nanoparticles may be very stably capped by an organic acid added together with the metal in a precursor state. Further, metal nanoparticles capped by a capping layer containing an organic acid may be prepared in a very high yield of 95% or more.

Similarly to the description as above, the inlet may be formed on one end or one end side of the jacket, and a first inlet to which a first solution is injected, and a second inlet to which a second solution is injected may be formed. Independently of this, the first and second solutions may be injected to a single inlet, by injecting the first and second, solutions to the inlet to be introduced and mixed with each other.

That is, the first and second solutions may be continuously injected to the reaction space, through the inlet formed in one end or one end side of the jacket, and a reaction product including metal nanoparticles capped by a capping layer may be continuously discharged, through the outlet formed in the other end or the other end side of the jacket, thereby preparing the metal nanoparticles. Here, in terms of precisely and reproducibly controlling the particle size distribution of the prepared metal nanoparticles, the first and second solutions may be injected simultaneously through a single inlet.

In the preparation method according to an exemplary embodiment of the present invention, the jacket and the cylinder may satisfy the following Equation 4:

$$0.1 \leq D/r_i \leq 0.4$$ [Equation 4]

wherein D is a spaced distance between the jacket and the cylinder; and $r_i$ is a radius of the cylinder.

As in Equation 4, a ratio ($D/r_i$) of the spaced distance between the jacket and the cylinder ($D=r_o$ (inner radius of jacket)$-r_i$) to the radius of the cylinder ($r_i$) is preferably 0.1-0.4.

The distance between the jacket and the cylinder may determine the size of a vortex cell of the vortex of a ring pair array to be formed, thereby influencing the size and distribution of the synthesized particles. Further, if a $D/r_i$ value is less than 0.1, the possibility that the synthesized particles fill the gap is greater, thereby lowering the processability, and if a $D/r_i$ value is more than 0.4, the size of the formed vortex cell becomes larger, so that it is difficult to expect a uniform mixing effect.

Specifically, it is preferred that Equation 4 is satisfied, and thus, the spaced distance between the jacket and the cylinder is 1 to 2.5 mm, so that the width of the reaction space is extremely small. It is preferred for preparation of the metal nanoparticles having a bimodal distribution, satisfying Equation 1 that the width of the reaction space is 1 to 2.5 mm, which is extremely small.

The residence time for which the injected reaction fluid including the first and second solutions stays in the reaction space may be adjusted by the rotational speed of the cylinder and the added amount of the reaction fluid.

It is preferred that the rotational speed of the cylinder is 400 rpm or more, in terms of forming a stable Taylor-Couette vortex. Further, homogeneous nanoparticles may be prepared, only if sufficient reactants are present in each vortex cell. Accordingly, the rotational speed of the cylinder is preferably 1000 rpm or less.

In terms of preparing the metal nanoparticles having a bimodal distribution satisfying Equation 1, the rotational speed of the cylinder is preferably 600 to 800 rpm. At this rotational speed, reactants present in the vortex cell are reacted to produce metal nuclei and grow particles constantly, and at the same time, particles having a certain size constantly grow between the grown particles to consume the growth driving force (driving force provided from the reactants and other fine particles) in the reaction field, and to inhibit growth of other particles or dissolve fine nuclei again, thereby preparing the metal nanoparticles satisfying Equation 1.

That is, the rotational speed of the cylinder may determine the entire nucleation and the growth driving force size of each vortex cell (fine reaction field), and as described above, the rotational speed of 600 to 800 rpm is the range in which metal nanoparticles at least satisfying Equation 1 may be prepared by continuous nucleation and growth, and abnormal growth of the grown particles.

In the preparation method according to an exemplary embodiment of the present invention, the reaction temperature is not particularly limited, but may be in a range of 100 to 350° C., preferably 120 to 200° C., and more preferably 130 to 150° C., and at this temperature, metal nanoparticles of high purity having an excellent specific resistance property may be prepared in a yield of 95% or more.

Preferably, the reaction temperature is 130 to 150° C., so that metal nanoparticles satisfying all of Equations 1, 2 and 3 may be prepared. The reaction temperature may influence the entire nucleation and the consumption rate of growth driving force in the vortex cell, and a nucleation degree. By a low temperature of 130 to 150° C., a size difference between relatively small particles and relatively large particles may be increased, and the increased ratio of relatively small particles and the decreased, average size of relatively small particles may be resulted.

Here, the reaction temperature influences the consumption rate of entire driving force, and the nucleation degree of the vortex cell, and as the rotational speed of the cylinder controls the entire driving force size of the vortex cell, it is preferred to adjust the reaction temperature and the rotational speed mutually, rather than to adjust them in the range suggested independently of each other. As a specific example, the rotational speed and the reaction temperature are in a proportional relationship, and for example, if the rotational speed is increased from 600 rpm to 800 rpm, it is preferred that the reaction temperature is increased from 130° C. to 150° C.

As each vortex cell forms each independent reaction field, the reactants present in the vortex cell are consumed, and abnormal grain growth between the metal nanoparticles present in the reaction field is the main reaction. Accordingly, in the case that abnormal grain growth period is excessively prolonged after the reactants are consumed, there is a risk that a relatively fine particle group is consumed. Therefore, the length of the jacket is preferably in the range of being advantageous for mass production, capable of stably forming plural vortex cells, and not excessively extending the section dominated by the abnormal grain growth, under the above-described temperature and rotational speed conditions. As a specific and non-limiting example, if Equation 4 is satisfied, the length of the jacket (the longitudinal axis length in the reaction space) may be 30 to 50 D (D=a spaced distance between the jacket and the cylinder).

In the preparation method according to an exemplary embodiment of the present invention, the residence time for which the reaction fluid including the first and second solutions injected through the inlet stays may be preferably 1 to 4 minutes. This residence time is adjustable by the injection rate of the reaction fluid injected through the inlet, in the above-described rotational speed and jacket length. That is, the injection rate of the first and second solutions may be that at which the residence time of the reaction fluid is 1 to 4 minutes.

In the preparation method according to an exemplary embodiment of the present invention, a spiral projection may be formed along the longitudinal axis direction, in the rotational direction of the cylinder, on the inner circumferential surface of the jacket. In the case that this spiral projection is formed, mixing efficiency of the reactants is further increased to complete the reduction reaction within a shorter time, thereby rapidly preparing the metal nanoparticles.

In the preparation method according to an exemplary embodiment of the present invention, the first solution may include a metal precursor, an organic acid and an organic amine, and the second solution may include a reducing agent.

The metal of the metal precursor may be one or two or more selected from the group consisting of copper, nickel, tin, aluminum and an alloy thereof. Specifically, the metal precursor may be one or more inorganic salts selected from, the group consisting of nitrates, sulfates, acetates, phosphates, silicates and hydrochlorides of metals selected from the group consisting of copper, nickel, aluminum and an alloy thereof.

The organic acid may be at least one type of straight-chain, branched and cyclic having 6-30 carbons, and may be one or two or more selected from the group consisting of saturated or unsaturated, acids. More specifically, the organic acid may be one or two or more selected from the group consisting of oleic acid, lysine oleic acid, stearic acid, hydroxystearic acid, linoleic acid, aminodecanoic acid, hydroxydecanoic acid, lauric acid, decenoic acid, undecenoic acid, palitoleic acid, hexyldecanoic acid, hydroxypalmitic acid, hydroxymyristic acid, hydroxydecanoic acid, palmitoleic acid, myristoleic acid, and the like, but not limited thereto.

The organic amine may be at least one type of straight-chain, branched and cyclic having 6-30 carbons, and may be one or two or more selected from the group consisting of saturated or unsaturated amines. More specifically, the organic amine may be selected from the group consisting of hexyl amine, heptyl amine, octyl amine, dodecyl amine, 2-ethylhexyl amine, 1,3-dimethyl-n-butyl amine, 1-amino-tridecane and the like, but not limited thereto.

The reducing agent may be preferably a hydrazine-based reducing agent, and the hydrazine-based reducing agent may be one or two or more selected from the group consisting of hydrazine, hydrazine anhydride, hydrazine hydrochloride, hydrazine sulfate, hydrazine hydrate and phenyl hydrazine. In addition, one or two or more selected from the group consisting of a hydride-based reducing agent; a borohydride-based reducing agent including tetrabutylammonium borohydride, tetramethylammonium borohydride, tetraethylammonium borohydride, sodium borohydride and the like; a sodium phosphate-based reducing agent; and ascorbic acid may be used. Among these, the hydrazine-based reducing agent is preferred, since it has high reducing power.

The compositional ratio of the first solution will be described: The compositional ratio is not particularly limited, but considering the capping efficiency, 0.2 to 4 mol, preferably 1 to 4 mol of an acid, and 0.2 mol or more, preferably 0.2 to 50 mol, more preferably 5 to 20 mol of an organic amine may be contained, relative to 1 mol of the metal precursor. The upper limit of the organic amine is not limited, since the organic amine serves as a non-aqueous solvent.

The first and second solutions may be injected so that the mole ratio of reducing agent/metal precursor is 1 to 100 in the first solution, relative to the content of the metal precursor. If the mole ratio (reducing agent/metal precursor) is less than 1, the metal ions of the metal precursor is not all reduced, and if it is more than 100, the amount of the reducing agent is excessive, thereby not influencing the reduction rate, which is not preferred in terms of the efficiency.

The metal nanoparticles discharged from the outlet may be collected as nanoparticles by a common method, or may be prepared as a conductive ink composition.

That is, the metal nanoparticles discharged from the outlet may be separated using the separation means such as a centrifuge, and dried, thereby being obtained as metal nanoparticles.

Further, the thus-prepared metal nanoparticles with a non-aqueous solvent and a binder are used to prepare the conductive ink composition, which is then coated on a substrate, and heated, thereby manufacturing a metal thin film. Here, it is preferred that heating is light sintering or laser irradiation.

Example 1

A first solution in which 1.41 mol of octyl amine, 0.20 mol of oleic acid and 0.14 mol of copper(II) acetate are mixed, and a second solution of 1.96 mol of phenyl hydrazine were prepared. A laminar shear flow reaction device in which a cylinder has an outer diameter of 19 mm, a jacket has an inner diameter of 23 mm, a gap of a reaction part between the cylinder and the jacket is 2 mm, and the length is 90 mm, was heated to 150° C. using a heating unit surrounding the jacket. A relative injection speed (volume/time) of the first and second solutions was at a ratio of 1.6:1, and the injection speed of the first and second solutions was adjusted so that the residence time were 1 minute, 2 minutes, and 4 minutes, thereby injecting the first and second solutions through the inlet of the reactor. The temperature of the reaction space was maintained at 150° C. by a heating unit, and the prepared first and second solutions were continuously injected using a syringe pump to the laminar shear flow continuous reactor and reacted, while rotating the cylinder at 800 rpm, thereby synthesizing copper nanoparticles. The metal nanoparticles obtained through the outlet of the reactor were washed using a centrifuge, and collected.

The prepared nanoparticles were confirmed to be copper nanoparticles by X-ray diffraction analysis. Regardless of the reaction time, it was recognized that the yield of the collected copper nanoparticles was 96%, and thus, a very high yield of the copper nanoparticles was obtained within a very short time.

The particle morphology of the thus-obtained copper nanoparticles when reacted for 2 minutes is shown in FIG. 2. As seen in FIG. 2, the relatively coarse particles having a bimodal distribution were confirmed to have a faceted polygonal shape. Here, the transmission electron microscope and the electron diffraction pattern were analyzed, thereby confirming that the prepared nanoparticles were monocrystal copper particles, and the faceted surface of the particles is composed of a {111} plane family, and {110} plane family.

Further, as seen in the transmission electron micrograph of FIG. 3, a capping layer having a thickness of about 1 nm was formed, and as a result of analyzing the C 1s and O 1s peaks using an X-ray photoelectron spectroscopy, it was confirmed by an oleic acid that a capping layer was formed.

Further, the oxidation degree of the prepared nanoparticles was calculated using an X-ray photoelectron spectroscopy. Specifically, Cu 2p peaks of copper and copper oxides were extracted, and the ratio between copper and copper oxide was analyzed through the area ratio between the two peaks, and as a result, it was confirmed that the relatively small nanoparticles belonging to the primary particles had the oxidation degree of 0.05 to 0.2, and the nanoparticles belonging to the secondary particles and having relatively larger size did not have surface oxidation.

As a result of measuring the size distribution of copper nanoparticles which was prepared using a dynamic light scattering method, it was confirmed that the particles having a bimodal distribution were prepared; in the case of the residence time of 2 minutes, the nanoparticles of $A_1/A_f=0.5$, $D1=70$ nm, and $D_2/D_1=3$ were prepared, in the case of the residence time of 1 minutes, the nanoparticles of $A_1/A_f=0.8$, $D1=50$ nm and $D_2/D_1=4$ were prepared, and in the case of the residence time of 4 minutes, the nanoparticles of $A_1/A_t=0.4$, D1=100 nm and $D_2/D_1=3$ were prepared.

A conductive ink composition was prepared by dispersing the nanoparticles obtained by reaction for 2 minutes in toluene, 20 parts by weight of copper nanoparticles and 1 part by weight of a non-aqueous polymer binder were added, based on 100 parts by weight of toluene, and then a copper conductive ink composition having a uniform dispersed phase was prepared through ball milling and ultrasonic irradiation. The prepared ink composition was coated in a thickness of 3 μm on an insulating substrate, using a casting method. The dried coated film was light-sintered by continuously irradiating light at 2.5 J/cm² for 1.5 msec, using a light source (linear B-type for Xenon PLA-2010 sintering system) having a wavelength band of 370-800 nm. The specific resistance of the copper thin film manufactured by light sintering was 6.8 μΩ·cm, showing an extremely good electrical property.

As a result of analyzing the light-sintered metal thin film with the X-ray photoelectron spectroscopy, it was confirmed that 60 wt % or more of the polymer binder remained in the metal thin film even after light irradiation, based on the amount of the polymer binder contained in the dried coating film before light irradiation. Further, after carrying out the flexural test 10,000 times, the specific resistance was measured, and it was confirmed that the rate of specific resistance increase ([specific resistance after flexural test−specific resistance before flexural test]/specific resistance before flexural test*100(%)) was 60% or less, based on the specific resistance right after manufacturing before the flexural test. Further, as a result of carrying out the adhesion strength test between a substrate and the metal thin film using a tape according to ASTM D3359-97, it was confirmed that the state of the substrate and the metal thin film being strongly bonded was still maintained, so that the metal thin film may not be peeled off by the tape.

Using the prepared samples (metal nanoparticles) from the residence time of 1 minute and 4 minutes, an ink composition was prepared, identically to the sample of 2 minutes, light sintering was carried out, and the flexural test and adhesive strength test were carried out. In the case of using the sample prepared from 1 minute residence time, a metal thin film having a specific resistance of 7 μΩ·cm was manufactured by light sintering, and in the case of the sample prepared from 4 minute residence time, a metal thin film having a specific resistance of 8.5 μΩ·cm was manufactured by light sintering. In the case of the metal thin films manufactured using the samples of 1 minute and 4 minutes, the results of the flexural test and the adhesive strength test were similar to those of the metal thin film manufactured using the sample of 2 minutes.

Example 2

Copper nanoparticles were prepared in the same manner as in Example 1, except that the reaction temperature was 130° C., the rotational speed of the cylinder was 600 rpm, and the residence time was fixed to 2 minutes, in Example 1.

As a result of measuring the size distribution of the copper nanoparticles prepared using the dynamic light scattering method, it was confirmed that particles having a bimodal distribution were prepared, and the nanoparticles of $A_1/A_t=0.6$, D1=100 nm, and $D_2/D_1=3.5$ were prepared.

Thereafter, a conductive ink composition was prepared in the same manner as in Example 1, and then on the coated film obtained by coating the ink composition and drying it, light sintering was carried out under the same condition as the sample of Example 1. It was confirmed that a metal thin film having a specific resistance of 9.0 μΩ·cm was manufactured by light sintering, and the obtained results of the flexural test and the adhesive strength test were similar to those of the metal thin film manufactured using the sample of Example 1.

Example 3

Copper nanoparticles were prepared in the same manner as in Example 1, except that the reaction temperature was 155° C., the rotational speed of the cylinder was 600 rpm, and the residence time was fixed to 2 minutes, in Example 1.

As a result of measuring the size distribution of the copper nanoparticles prepared using the dynamic light scattering method, it was confirmed that the nanoparticles of $A_1/A_t=0.1$, D1=100 nm, and $D_2/D_1=2$ were prepared.

Thereafter, a conductive ink composition was prepared in the same manner as in Example 1, and then on the coated film obtained by coating the ink composition and drying it, light sintering was carried out under the same condition as the sample of Example 1. It was confirmed that a metal thin film having a specific resistance of 60.0 μΩ·cm was manufactured by light sintering.

Example 4

Copper nanoparticles were prepared in the same manner as in Example 1, except that the reaction temperature was 125° C., the rotational speed of the cylinder was 800 rpm, and the residence time was fixed to 2 minutes, in Example 1.

As a result of measuring the size distribution of the copper nanoparticles prepared using the dynamic light scattering method, it was confirmed that the nanoparticles of $A_1/A_t=0.8$, D1=5 nm, and $D_2/D_1=2$ were prepared.

Thereafter, a conductive ink composition was prepared in the same manner as in Example 1, and then on the coated film obtained by coating the ink composition and drying it, light sintering was carried out under the same condition as the sample of Example 1. It was confirmed that a metal thin film having a specific resistance of 50.0 μΩ·cm was manufactured by light sintering.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. Metal nanoparticles having a bimodal size distribution including a first peak and a second peak wherein the first peak has a smaller median size than the second peak, and satisfying the following Equation 1, wherein particles belonging to the second peak have a faceted polygonal shape having a surface consisting of a {111} plane family only or a {111} plane family and a {110} plane family wherein a tangent slope of the surface discontinuously changes and having a pure metal surface by preventing formation of an oxide film, and a metal core having a FCC crystal structure is capped by a capping layer containing an organic acid:

$$0.4 \leq A_1/A_t \leq 0.8 \quad \text{[Equation 1]}$$

wherein $A_1$ is an area of the first peak; and $A_t$ is the sum of areas of the first peak and the second peak.

2. The metal nanoparticles of claim 1, wherein they further satisfy the following Equations 2 and 3:

$$30 \text{ nm} \leq D_1 \leq 100 \text{ nm} \quad \text{[Equation 2]}$$

wherein $D_1$ is a median size of the first peak;

$$3 \leq D_2/D_1 \leq 5 \quad \text{[Equation 3]}$$

wherein $D_1$ is as defined in Equation 2; and $D_2$ is a median size of the second peak.

3. The metal nanoparticles of claim 1, wherein particles belonging to the first peak has an oxidation degree of 0.2 of less, the oxidation degree being a ratio obtained by dividing a Cu 2p peak area of copper oxides by a Cu 2p peak area of copper, in an X-ray photoelectron spectroscopy spectrum.

4. The metal nanoparticles of claim 1, wherein the organic acid is one or two or more selected from the group consisting of oleic acid, lysine oleic acid, stearic acid, hydroxystearic acid, linoleic acid, aminodecanoic acid, hydroxydecanoic acid, lauric acid, decenoic acid, undecenoic acid, palitoleic acid, hexyldecanoic acid, hydroxypalmitic acid, hydroxymyristic acid, hydroxydecanoic acid, palmitoleic acid and myristoleic acid.

5. The metal nanoparticles of claim 1, wherein the capping layer has a thickness of 1 to 2 nm.

6. The metal nanoparticles of claim 1, wherein the metal nanoparticles are one or more selected from the group consisting of copper, nickel, aluminum and an alloy thereof.

7. The metal nanoparticles of claim 1, wherein the metal nanoparticles are for light sintering or laser sintering.

8. A continuous preparation method for making the metal nanoparticles of claim 1, comprising: continuously injecting a first solution containing an organic acid, an organic amine and a metal precursor and a second solution containing a reducing agent to a reaction space between a hollow cylindrical jacket and a rotating cylinder forming a concentric structure with the jacket and being disposed apart from the jacket.

9. The method of claim 8, wherein the first and second solutions are continuously injected to the reaction space, through an inlet formed in one end or one end side of the jacket, and a reaction product including metal nanoparticles capped by a capping layer containing an organic acid is continuously discharged, through an outlet formed in the other end or the other end side of the jacket.

10. The method of claim 8, wherein the jacket and the cylinder satisfy the following Equation 4:

$$0.1 \leq D/r_1 \leq 0.4 \quad \text{[Equation 4]}$$

wherein D is a spaced distance between the jacket and the cylinder; and n is a radius of the cylinder.

11. The method of claim 8, wherein a rotational speed of the cylinder is 400 to 1000 rpm.

12. The method of claim 8, wherein the temperature of the reaction space is 100 to 350° C.

* * * * *